UNITED STATES PATENT OFFICE.

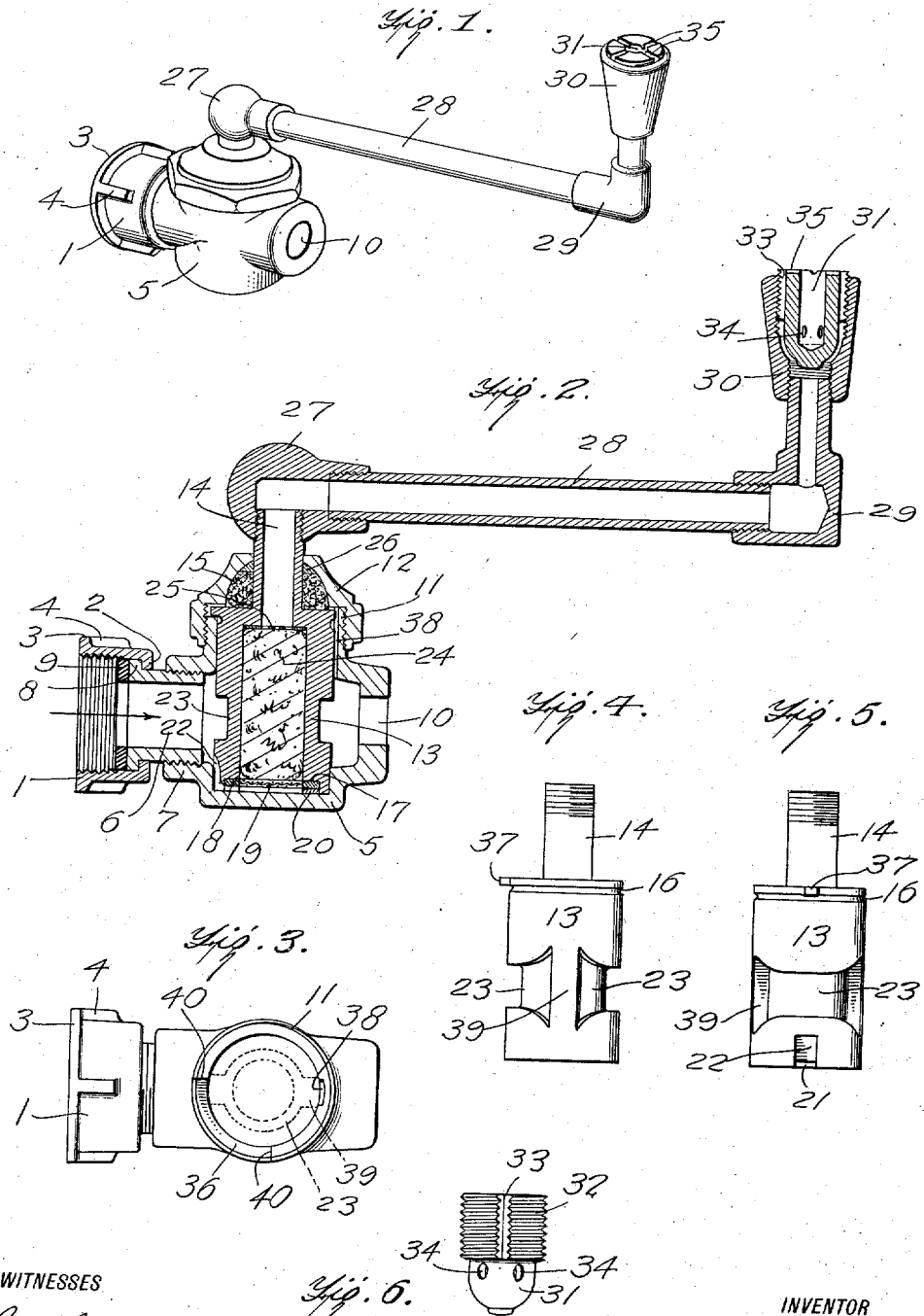

JAMES J. PIPER, OF COLORADO SPRINGS, COLORADO.

SANITARY WATER-FOUNTAIN.

1,149,856.   Specification of Letters Patent.   Patented Aug. 10, 1915.

Application filed December 19, 1914. Serial No. 878,078.

*To all whom it may concern:*

Be it known that I, JAMES J. PIPER, a citizen of the United States, and a resident of Colorado Springs, in the county of El Paso and State of Colorado, have invented a new and useful Improvement in Sanitary Water-Fountains, of which the following is a specification.

My invention is an improvement in sanitary water fountains, and has for its object to provide a fountain of the character specified, adapted to be connected to any desired valve, and wherein mechanism is provided in connection with the fountain for filtering the water as it passes from the valve to the container.

In the drawings:—Figure 1 is a perspective view of the improved fountain, Fig. 2 is a longitudinal vertical section, Fig. 3 is a top plan view with the handle removed, Fig. 4 is a rear view of the barrel or cylinder, Fig. 5 is a side view, and Fig. 6 is a side view of the nozzle.

The present embodiment of the invention comprises a reducing medium or connector, consisting of an internally threaded sleeve 1, having at its outer end an inwardly extending flange 2, and provided at its inner end with an external annular rib 3, from which extend other ribs 4 at spaced intervals longitudinally of the sleeve. The sleeve 1 is adapted to be threaded on to the bib valve and a casing 5 is connected to the sleeve 1, by means of a connecting sleeve 6. This sleeve 6 is externally threaded at one end for engaging in an internally threaded nipple 7 of the casing 5, and at the opposite end the sleeve has an annular rib 8, fitting against the flange 2, and a packing ring 9 is arranged between the end of the connecting sleeve and the end of the bib valve to which it is connected.

The casing 5 has an outlet port 10 opposite the nipple 7, which is the inlet port, and the casing is also provided with an externally threaded nipple 11 at its top. A cap or packing nut 12 engages the nipple 11, and a cylindrical hollow valve body 13 is arranged within the said casing 5.

The valve body has a hollow stem 14, extending upwardly through the packing nut 12, and a packing 15 is arranged between the nut and the stem. The valve 12 fills the nipple 11, fitting the same closely and the said body is provided with an annular groove 16, near its upper end. The bore of the valve body extends entirely through the body and the stem, opening at the lower end of the body, and the lower end of the body is counterbored around the bore as indicated at 17.

A screen is arranged in the counterbore, the screen comprising a ring or washer 18, having an internal diameter equal to that of the body and fitting the counterbored portion, and a filling 19 of perforate material.

A ring 20 is arranged in the counterbore below the washer for holding the screen in place and the body is provided with a radial notch or recess 21, extending from the bore to the periphery and communicating with a second notch or groove 22, extending longitudinally of the body. The body is also recessed on its peripheral surface at opposite sides as indicated at 23, and it will be noticed that the recesses extend circumferentially of the body, each covering approximately half the circumference and at their ends the recesses are widened as shown in Figs. 4 and 5.

The valve body is rotatable in the casing 5, and filtering material indicated at 24, is arranged within the bore above the screen, and a plate or disk 25 of perforate material is arranged above the filtering material between the bore of the body and the bore of the stem 14.

A washer 26 is arranged in the packing nut above the packing and the upper end of the stem which extends beyond the packing nut is externally threaded for engaging one end of an arm 27. The other end of the elbow is engaged by one end of a pipe 28, and a second elbow 29 has one end connected with the other end of the pipe.

The opposite end of the elbow 29 is threaded into the small end of a frusto-conical or tapering sleeve 30, and the large end of the sleeve is engaged by a nozzle, a cup-shaped body 31. This cup-shaped body has its upper end enlarged and externally threaded as shown at 32, and longitudinally extending grooves 33 are provided in the threaded portion. The body also has radial openings 34 near the inner end of the threaded portion and the said threaded portion is adapted to engage the internally threaded portion of the sleeve 30.

The upper end of the body is provided with radial recesses or notches 35, extending from the grooves 33 inwardly. The upper end of the nipple 11 of the casing 5 is cut away as indicated at 36, over an extent of 90 degrees and the cylindrical body has a radial lug 37 above the groove 16, for engaging the ends of the cut-away portion to limit the movement of the valve body in the casing. The casing 5 is also provided with an internal groove 38, extending from that portion of the casing in which the port 10 is arranged to the groove 16.

In operation, when the parts are in the position of Figs. 1 and 2, the recesses 23 are at the nipple 7 and at the port 10, and the valve body closes the communication between the nipple and the port. It will be noted from an inspection of Figs. 4 and 5 that the ends of the recesses 23 are separated from each other by a vertical bar or rib 39, which is an integral portion of the body.

The peripheral surface of the body fits closely in the casing 5, so that when the recesses 23 are at the port 10 and the nipple 7, the communication between the port and the nipple will be closed. The water however, from the valve may flow through the connecting sleeve 6 into the casing 5, and by way of the recesses 21 and 22 to the interior or bore of the valve body.

The water passes up through the filtering material and through the stem, the elbows 27 and 29 and the pipe 28 to the sleeve 30, and the water is discharged by way of the grooves 33 and by way of the interior of the cup-shaped member 31. When the body is turned in such manner that the integral ribs 39 are at the port 10 and the nipple 7, the water may flow directly from the faucet or valve through the casing 5 and the port 10 to the place of discharge.

By means of the cup-shaped member 31, the flow of water through the said member may be cut off. When the said member is turned to cause it to move downwardly, the lower rounded end will contact with the interior of the sleeve 30, closing the communication through the sleeve. Whenever the parts are in the position of Figs. 1 and 2, the water flowing through the valve body will be thoroughly filtered, and will pass out through the member 31, which is in fact a distributing nozzle, and will be thrown upward so that the user can drink without touching the lips to any part of the fountain.

The water may be shut off whenever desired, by turning down the distributing nozzle, or by turning the valve with respect to the casing 5. When the valve body is turned to bring the recess 22 out of register with the nipple 7, the water can no longer flow into the valve body, and if the valve body is not turned too far the port 10 will also be shut off from the nipple 7.

The valve body may move a quarter turn, this extent of movement being permitted by the shoulders 40, formed at the ends of the cut-away portion 36, and when the body is at one end of its movement, the water may flow by way of the fountain and when at the other end the water may flow by way of the port 10 and half way between these points the water is shut off from both the fountain and port 10.

I claim:—

1. A water fountain for attachment to a delivery valve, and comprising a casing of approximately cylindrical form having oppositely arranged inlet and outlet ports, means at the inlet port for permitting the casing to be connected to the valve, a cylindrical valve body fitting the casing and rotatable therein, and chambered longitudinally and having a hollow stem extending above the casing, a tubular handle connected with the stem, and having a delivery nozzle at its outer end, the valve body being adapted to contain filtering material, a screen at each end of the body, said body having at its lower end a radial recess and having a longitudinal groove leading upward from the recess for placing the interior of the body in connection with the inlet port of the casing when in register therewith, said body having oppositely arranged circumferential recesses for placing the inlet and the outlet ports in communication when the groove is out of register with the inlet port, and means in connection with the valve body and the casing for limiting the movement of the body.

2. A water fountain for attachment to a delivery valve, and comprising a casing of approximately cylindrical form having oppositely arranged inlet and outlet ports, means at the inlet port for permitting the casing to be connected to the valve, a cylindrical valve body fitting the casing and rotatable therein, and chambered longitudinally and having a hollow stem extending above the casing, a tubular handle connected with the stem, and having a delivery nozzle at its outer end, the valve body being adapted to contain filtering material, said body having at its lower end a radial recess and having a longitudinal groove leading upward from the recess for placing the interior of the body in communication with the inlet port of the casing when in register therewith, said body having oppositely arranged circumferential recesses for placing the inlet and the outlet ports in communication when the groove is out of register with the inlet port.

3. A water fountain for attachment to a delivery valve, and comprising a casing having inlet and outlet ports, and having means at the inlet port for permitting the casing to be connected to the valve, a valve body mounted to rotate within the casing between the inlet and the outlet ports and having a chamber extending transversely of the ports and adapted to contain filtering material, said valve body having a port at one end adapted to register with the inlet port, and having an outlet or delivery pipe at the opposite end, and serving as a handle to permit the body to be rotated to bring the inlet port thereof in register with the inlet port of the casing, said valve body having means for placing the ports of the casing in communication when the said body is turned in the opposite direction.

4. A water fountain for attachment to a delivery valve, and comprising a valve casing having an inlet port, a valve body mounted to rotate in the casing and having a chamber for containing filtering material said body having ports oppositely arranged and leading from the chamber, one of the ports being adapted to register with the inlet port of the casing when the valve body is turned to a predetermined position, and a delivery pipe connected with the valve for turning the valve, said pipe communicating with the other port of the valve.

5. A device of the character specified, comprising a valve casing having inlet and outlet ports, a valve body between the ports, said body being chambered and adapted to contain a filtering material and having inlet and outlet ports for the chamber, a delivery pipe connected with the body and communicating with the chamber by way of the outlet port, and rigidly connected with the body to permit the body to be turned by the pipe to bring the inlet port of the body in register with the inlet port of the casing, the body having means for placing the ports of the casing in communication when the said body is turned in the opposite direction.

JAMES J. PIPER.

Witnesses:
GEO. A. BOYD,
LEO J. PIPER.

Copies of this patent may be obtained for five cents each, by addressing the "Commissioner of Patents, Washington, D. C."